United States Patent [19]

Suzuki et al.

[11] Patent Number: 5,169,223
[45] Date of Patent: Dec. 8, 1992

[54] TELESCOPIC COVER APPARATUS

[75] Inventors: Ryuji Suzuki; Akihiko Fujimoto; Shinya Okamoto, all of Oshino, Japan

[73] Assignee: Fanuc Ltd., Minamitsuru, Japan

[21] Appl. No.: 566,473

[22] PCT Filed: Dec. 5, 1989

[86] PCT No.: PCT/JP89/01222
§ 371 Date: Aug. 21, 1990
§ 102(e) Date: Aug. 21, 1990

[87] PCT Pub. No.: WO90/07400
PCT Pub. Date: Jul. 12, 1990

[30] Foreign Application Priority Data

Dec. 24, 1988 [JP] Japan ................... 62-324793

[51] Int. Cl.$^5$ ................................. A47B 88/00
[52] U.S. Cl. ....................... 312/330.1; 312/205; 384/15; 160/202
[58] Field of Search ............ 312/330.1, 110, 205, 312/208, 331; 384/15, 16; 160/202, 211, 216

[56] References Cited

U.S. PATENT DOCUMENTS 3,565,153  2/1971  Loos et al. ................. 160/202
3,578,061  5/1971  Hascheck et al. .......... 160/202
3,751,120  8/1973  Kietz ........................... 384/15
3,788,377  1/1974  Knowles ................... 384/15 X

FOREIGN PATENT DOCUMENTS 5175686  12/1974  Japan .
6353643   4/1988  Japan .
757555    9/1956  United Kingdom ............ 384/15

OTHER PUBLICATIONS

"Improving Sllideway-protection Devices", Stanki Instrument, vol. 45, Issue 5, 1974, pp. 17-18.

Primary Examiner—Kenneth J. Dorner
Assistant Examiner—Brian K. Green
Attorney, Agent, or Firm—Staas & Halsey

[57] ABSTRACT

A telescopic cover apparatus, which is mounted on a machine tool, includes a telescopic cover, including first to seventh cover members slidably fitted with one another, and a pantogragh drive mechanism including first to sixth parallelogrammatic link mechanisms continuously arranged in the cover extension/contraction direction. Each link mechanism includes first to fourth link members and first to fourth joints for pivotally coupling the link ends to one another. When a movable table of the machine tool moves, the first cover member fixed to a stationary saddle of the machine tool, along with the first joint of the first link mechanism, is kept at a standstill, while the seventh cover member fixed to the movable table, along with the fourth joint of the sixth link mechanism, moves in unison with the table, and the second to sixth cover members, connected to the respective fourth joints of the first to fifth link mechanisms aligned with one another, smoothly and cooperatively move in unison with these joints along guide rails.

4 Claims, 4 Drawing Sheets

TELESCOPIC COVER APPARATUS

BACKGROUND OF THE INVENTION

The present invention relates to a telescopic cover apparatus mounted on a machine tool or the like, and more particularly, to a telescopic cover apparatus having a telescopic cover capable of smooth extension and contraction.

Conventionally known is a telescopic cover for protection which, composed of a plurality of cover members, is capable of extension and contraction. In the case of mounting the protective telescopic cover on a machine tool, for example, the opposite ends of the telescopic cover are fixed individually to a stationary saddle of the machine tool and a movable table slidably mounted on the saddle, so that the telescopic cover extends or contracts as the table moves, thereby protecting the sliding surfaces of the saddle and the table from dust, for example.

The conventional telescopic cover, however, is only designed so that each two adjacent ones of the plurality of cover members are slidably fitted with each other. Thus, when the telescopic cover extends or contracts, the individual cover members slide without cooperation, so that the sliding directions and sliding strokes of the individual cover members are irregular, and the cover is liable to undergo a twist or the like. As a result, the telescopic cover sometimes may produce noise or be damaged when it extends or contracts.

SUMMARY OF THE INVENTION

The object of the present invention is to provide a telescopic cover apparatus having a telescopic cover capable of smooth extension and contraction and enjoying a long working life.

In order to achieve the above objects, according to the present invention, there is provided a telescopic cover apparatus, which is mounted on a machine having a stationary section and a movable section. The telescopic cover apparatus includes: a telescopic cover having a plurality of cover members which are slidably fitted with one another, and which include two cover members on a machine stationary section side and a machine movable section side fixed to the stationary section and the movable section of the machine, respectively; and a pantograph drive mechanism for extending or contracting the telescopic cover, the drive mechanism including a plurality of quadrilateral link mechanisms continuously arranged in a direction along which the telescopic cover extends and contracts, and connected individually to their corresponding ones of the plurality of cover members.

Preferably, the telescopic cover apparatus includes a linear guide member extending in the telescopic cover extension/contraction direction, and adapted to guide at least one of the plurality of cover members.

As described above, according to the present invention, since the telescopic cover apparatus is arranged to extend and contract the telescopic cover, composed of the cover members which are slidably fitted with one another, by means of the pantograph drive mechanism, which includes the plurality of link mechanisms continuously arranged in the telescopic cover extension/contraction direction, the individual cover members can smoothly slide in cooperation with one another. As a result, the sliding motion of the individual cover members can be controlled, so that the telescopic cover can be prevented from producing noise or being twisted or damaged as it extends or contracts, thus enjoying a longer working life.

DESCRIPTION OF THE PREFERRED EMBODIMENTS

Referring to FIGS. 1 to 4, a machine tool furnished with a telescopic cover apparatus according to one embodiment of the present invention will be described.

Figure 1:
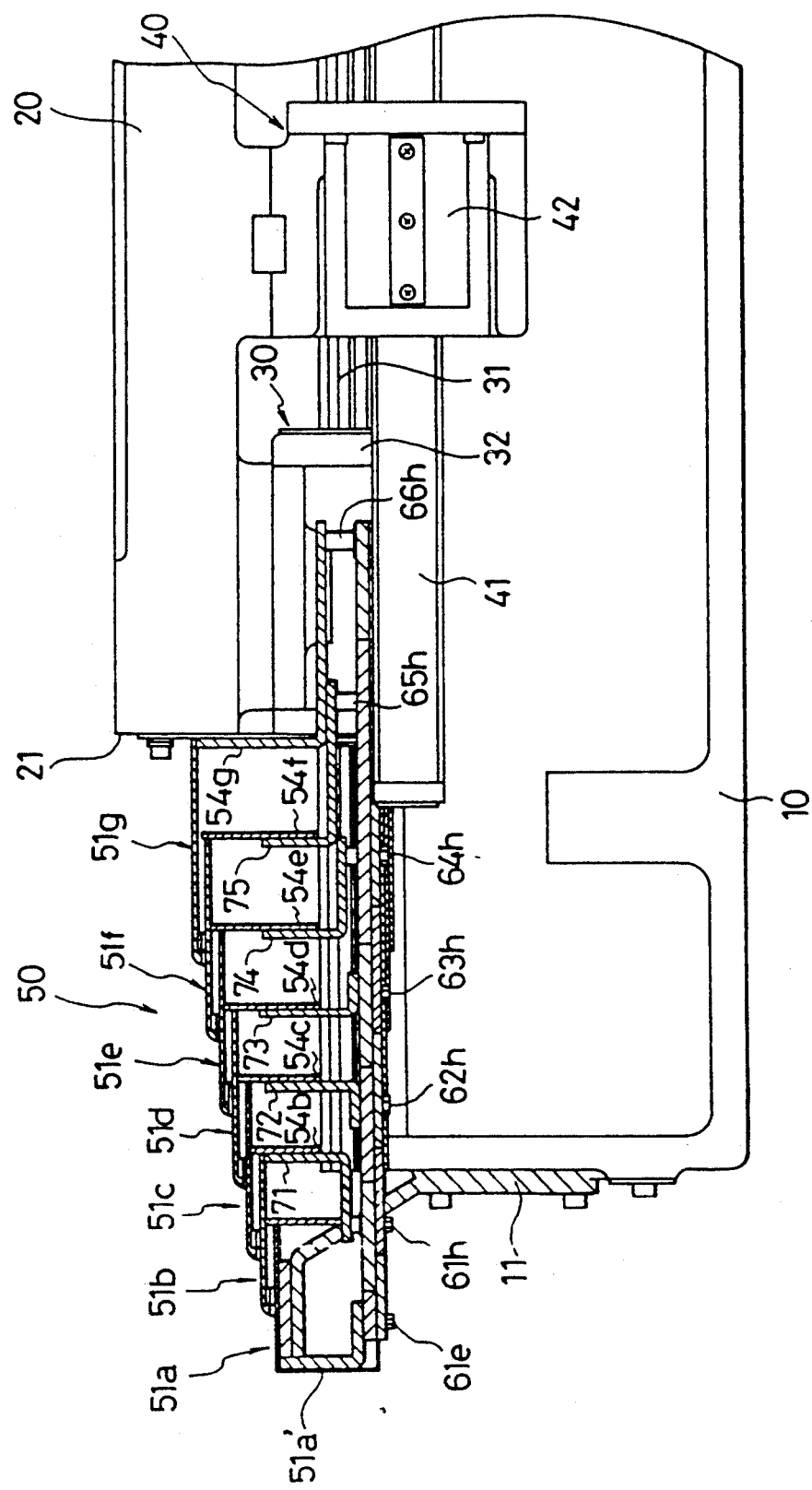
FIG. 1 is a fragmentary sectional front view showing a machine tool, which is furnished with a telescopic cover apparatus according to one embodiment of the present invention.

As shown in FIG. 1, the machine tool includes a stationary saddle 10, a movable table 20 mounted on the saddle 10, a linear guide 30 for guiding the table 20, and a drive unit 40 for driving the table 20. The movable table 20 is arranged to reciprocate relatively to the stationary saddle 10 along the linear guide 30, when the table is driven by the drive unit 40.

More specifically, the linear guide 30 includes a pair of guide rails 31 and 31' fixed individually to the top surface of the stationary saddle 10, and a guide block 32 fixed to the underside of the movable table 20 and slidably fitted on the guide rails 31 and 31'. The drive unit 40 includes a ball screw 41, which is rotatably supported by the saddle 10 and operatively coupled to a motor (not shown), and a ball nut 42 fixed to the underside of the table 20 so as to be movable in unison with the table and threadedly engaged with the ball screw 41. Namely, the movable table 20, which is integral with the ball nut 42, is arranged to be guided by the guide rails 31 and 31' through the medium of the guide block 32 to reciprocate along the guide rails, when the ball screw 41 rotates forwardly or reversely.

The machine tool further includes a telescopic cover apparatus. The telescopic cover apparatus includes a telescopic cover 50 for covering the stationary saddle 10 and the like. The opposite ends of the cover are fixed individually to a stay 11, which is fixed to one end face of the stationary saddle 10, and to one end face 21 of the movable table 20. The telescopic cover 50 is provided with a required number of cover members, e.g., seven cover members 51a to 51g, and the adjacent cover members are slidably fitted with one another. The first to seventh cover members 51a to 51g have basically the same construction and are similar in shape to one another. The size of each cover member is larger than that of the adjacent one located at the side away from the table 20.

Figure 2:
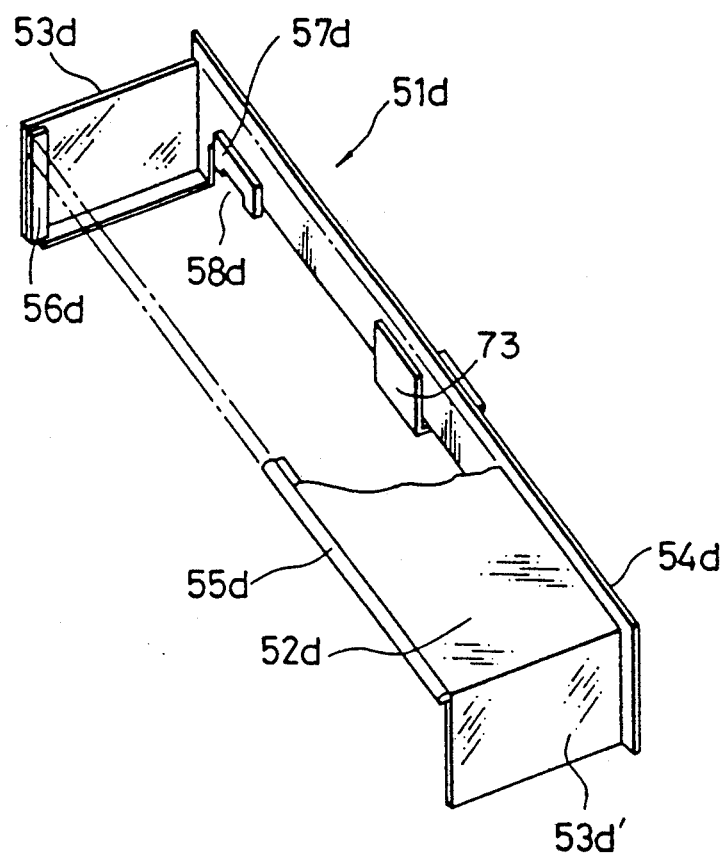
FIG. 2 is a fragmentary cutaway perspective view showing one of the cover members shown in FIG. 1.

As shown in FIG. 2, each cover member, e.g., the fourth cover 51d, has a body composed of a top wall 52d and left and right side walls 53d and 53d' which are formed integrally with one another by sheet metal working. A rear wall 54d formed of a plate member is fixed to the proximal end face of the cover member body. Thus, the cover member 51d is, as a whole, shaped into a box, which has an open distal end face. The rear wall 54d is formed so that its upper edge portion and left and right edge portions project outward from the top surface and opposite side faces of the cover member body, respectively. Also, a wiper 55d formed of elastic material is fixed to the upper edge of the distal end of the top wall 52d. The wiper 55d extends substantially across the full width of the top wall 52d. Further, a pair of stoppers 56d and 56d' formed of elastic material are respectively fixed to the inner surfaces of the two side walls 53d and 53d'. These two stoppers extend along the respective distal end edges of the side walls, substantially extending along the overall height of the side walls. The respective rear-wall-side end faces of the wiper 55d and the stoppers 56d and 56d' are flush with one another. A pair of reinforcing members 57d and 57d', each formed of a thick plastic plate, are fixed to the inner surfaces of the left and right end portions of the rear wall 54d, respectively. Engaging portions (one of which is designated by numeral 58d), slidably fitted to the guide rails 31 and 31' of the linear guide 30, are formed individually at the lower portions of the reinforcing members, whereby the direction of motion of the fourth cover member 51d is restricted so that this cover member cannot be biased in the transverse direction thereof, with respect to a target transfer path.

The cover members 51a to 51c and 51e to 51g are constructed substantially in the same manner as the fourth cover member 51d, so that a description of those cover members is omitted. Instead of stoppers and a wiper, however, a front wall 51a' is fixed to the distal end of the first cover member 51a. The front wall 51a' is fixed, by means of the stay 11, to that end face of the stationary saddle 10 on the side remote from the table. Unlike the rear walls of the other cover members, moreover, the rear wall 54g of the seventh cover member 51g is formed into an L-shape as seen in its longitudinal section. A vertical wall portion of the rear wall 54g is fixed to the end face 21 of the movable table 20, while its horizontal wall portion extends along the underside of the table 20. The second to fifth guide members are provided with reinforcing members which engage the guide rails 31 and 31'. These reinforcing members are designated individually by numerals 57b to 57f in FIG. 3.

The telescopic cover apparatus further includes a pantograph drive mechanism (hereinafter referred to as pantograph mechanism) for extending and contracting the telescopic cover 50. This pantograph, which is disposed between the telescopic cover 50 and the stationary saddle 10, includes first to sixth link mechanisms 61 to 66 each in the form of a parallelogram and coupled to one another. These link mechanisms 61 to 66 have substantially the same construction and are similar in shape to one another, and the dimensional ratio between the adjacent ones is substantially equal to the dimensional ratio between their corresponding adjacent ones of the second to sixth cover members 51b to 51f.

Each link mechanism, e.g., the first link mechanism 61, includes first to fourth link members 61a to 61d which cooperate with one another to form a quadrilateral. The respective ends of the first and second link members 61a and 61b on the side remote from the table are pivotally coupled to each other by means of a first joint 61e, and the table-side end of the first link member 61a and the end of the third link member 61c on the side remote from the table are pivotally coupled by means of a second joint 61f. Further, the table-side end of the second link member 61b and the end of the fourth link member 61d on the side remote from the table are pivotally coupled by means of a third joint 61g, and the respective table-side ends of the third and fourth link members 61c and 61d are pivotally coupled by a fourth joint 61h.

The respective first joints of the second to fifth link mechanisms 62 to 65 are identical with the respective fourth joints of the first to fourth link mechanisms 61 to 64, respectively (e.g., the first joint of the second link mechanism is identical with the fourth joint 61h of the first link mechanism). Moreover, the respective first and second link members of the link mechanisms 62 to 65 are integral with the third and fourth link members of the link mechanisms 61 to 64, respectively (e.g., the first and second link members 62a and 62b of the second link mechanism are integral with the third and fourth links 61c and 61d of the first link mechanism, respectively). Further, the fourth joint 65h of the fifth link mechanism and the first joint of the sixth link mechanism are identical with each other, and the third and fourth link members 65c and 65d of the fifth link mechanism are integral with the first and second link members 66a and 66b of the sixth link mechanism, respectively. Also, the first joint 61e of the first link mechanism and the respective fourth joints 61a to 66h of the first to sixth link mechanisms are arranged on a straight line which extends in the extending or contracting direction of the telescopic cover 50, that is, in the extending direction of the guide rails 31 and 31'. The first joint 61e of the first link mechanism is fixed to the front wall 51a' of the first cover member by means of a bracket, that is, the joint 61e is fixed to the end face of the stationary saddle 10 on the side remote from the table by means of the front wall 51a', the stay 11 and the like. The fourth joint 66h of the sixth link mechanism is connected to the distal end of the horizontal wall portion of the L-shaped rear wall 54g of the seventh cover member. Namely, the joint 66h is fixed to the movable table end face 21 by means of the cover member rear wall 54g.

The pantograph mechanism further includes first to fifth coupling members 71 to 75, each of which has a horizontal wall and a vertical wall integral with each other, and is, as a whole, formed into an L-shape as seen in its longitudinal section. The respective vertical walls of these coupling members 71 to 75 are fixed to the central portions of the inner surfaces of the rear walls 54b to 54f of their corresponding second to sixth cover members on the side remote from the movable table, so that the members 71 to 75 are movable in unison with the second to sixth cover members 51b to 51f. The respective horizontal walls of the first and second coupling members 71 and 72 extend away from the table, while the respective horizontal walls of the third to fifth coupling members 73 to 75 extend toward the table. The distal ends of these five horizontal walls are coupled individually to the respective fourth joints 61h to 65h of the first to fifth link mechanisms.

In the following, the operation of the machine tool, which is mounted with the telescopic cover apparatus as constructed above, will be explained.

When the ball screw 41 of the drive unit 40 is driven forwardly by means of the motor (not shown) while the machine tool is operating, the movable table 20, guided by the guide rails 31 and 31' through the medium of the guide block 32 of the linear guide 30, moves along these two guide rails toward the end face of the stationary saddle 10 on the side of the stay 11 in unison with the ball nut 42, which is threadedly engaged with the ball screw 41. As the table 20 moves in this manner, the pantograph mechanism, having the first joint 61e of the first link mechanism and fourth joint 66h of the six link mechanism respectively fixed to the stationary saddle 10 and the movable table 20, shifts from an extended state of FIG. 4 to a contracted state of FIG. 3.

When the pantograph mechanism is in contracting motion, the first joint 61e of the first link mechanism is kept at a standstill, while the fourth joint 66h of the sixth link mechanism moves in unison with the movable table 20, and the fourth joints 61h to 65h of the first to fifth link mechanism individually move toward the stay 11 for distances proportional to the respective lengths of the link members 61a to 61d, 62a to 62d,—, and 65a to 65d of the individual link mechanisms. As a result, the seventh cover member 51g moves in unison with the table 20, and the second to sixth cover members 51b to 51f, whose rear walls 54b to 54f are respectively coupled to the joints 61h to 65h by means of the coupling members 71 to 75, move for distances equal to the movement distances of their corresponding joints, in the same direction therewith. Further, the second to sixth cover members 51b to 51f, which have the reinforcing members 57b to 57f, respectively, slidably mating with the guide rails 31 and 31', move guided by the guide rails 31 and 31'.

Thus, when the movable table 20 moves toward the stay 11, the first cover member 51a of the telescopic cover 50 is kept at a standstill, while the second to seventh cover members 51b to 51g individually move along the guide rails 31 and 31' so that the ratio between the movements of each two adjacent cover members has a predetermined value. In other words, the second the seventh cover members 51b to 51g smoothly move straight in cooperation with one another. As a result, the telescopic cover 50 can contract without producing noise or undergoing a twist or the like as a whole. While the telescopic cover 50 is contracting, moreover, the respective wipers of the second to seventh cover members slide on the top surfaces of the respective top walls of their corresponding first to sixth cover members, while brushing off swarf and the like, in a manner such that the wipers are kept in contact with the top surfaces of the top walls.

Figure 3:
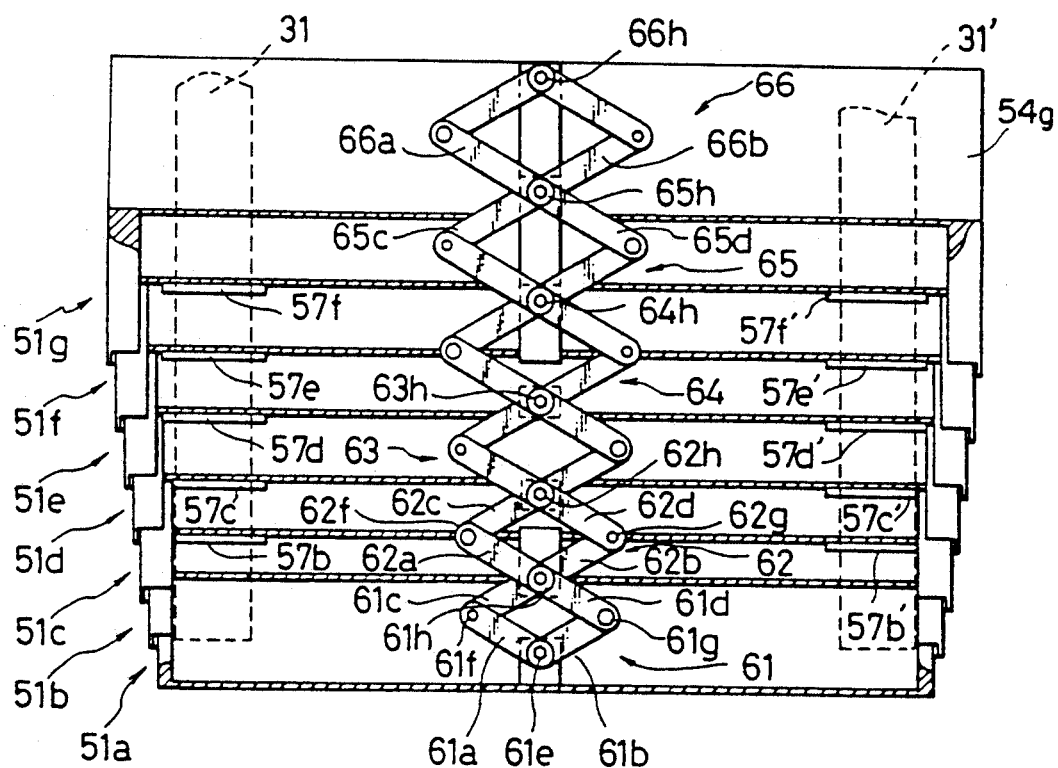
FIG. 3 is a bottom view showing a telescopic cover, a pantograph drive mechanism, and a pair of guide rails of FIG. 1, with the drive mechanism in a contracted state.
Figure 4:
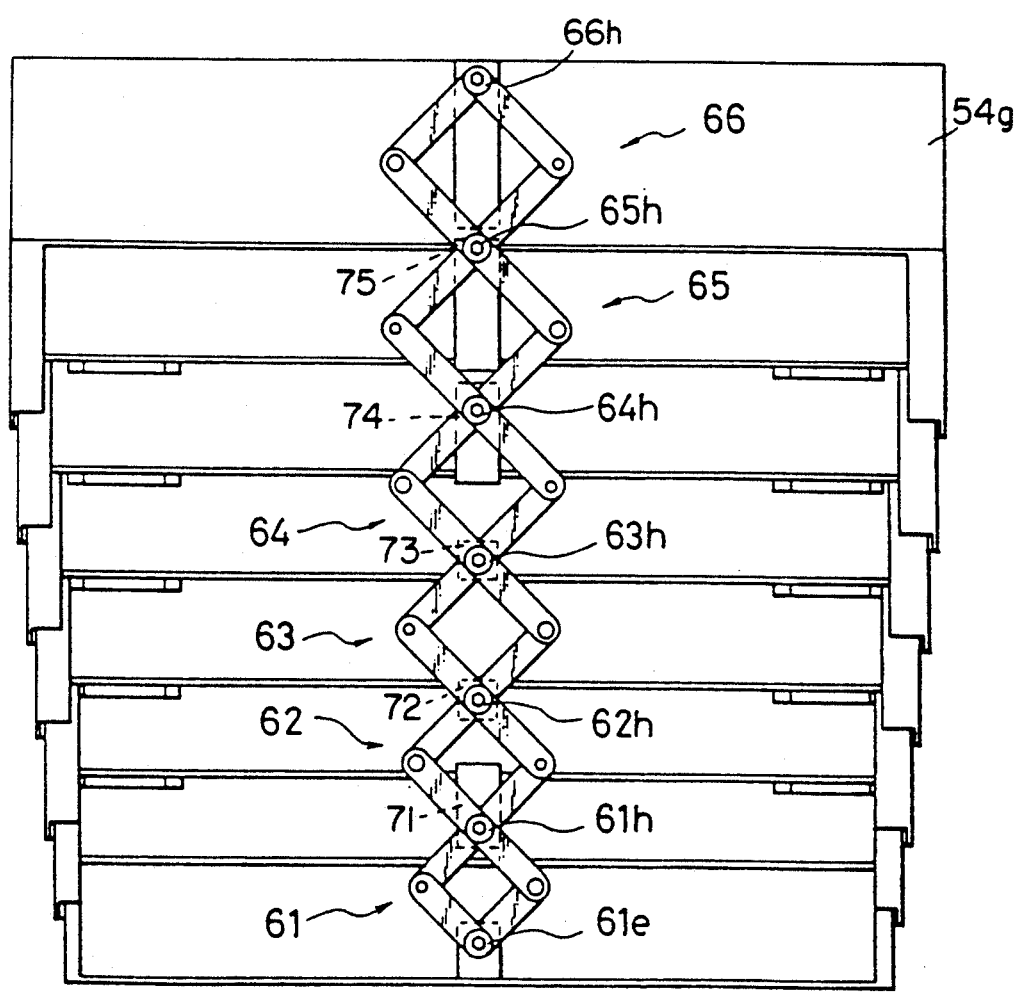
FIG. 4 is a view similar to FIG. 3, showing the pantograph drive mechanism in an extended state.

When the movable table 20 moves to the side away from the stay 11 as the ball screw 41 rotates reversely, on the other hand, the pantograph mechanism shifts from the contracted state of FIG. 3 to the extended state of FIG. 4. At this time, as in the case of the contracting motion, the first cover member 51a connected to the first joint 61e of the first link mechanism is kept at a standstill, while the fourth joints 61h to 65h of the first to fifth link mechanisms and the second to seventh cover members 51b to 51g, connected individually to the movable table 20, smoothly move straight along the guide rails 31 and 31' to the side remote from the stay 11, in cooperation with one another. As a result, the telescopic cover 50 can extend without producing noise or undergoing a twist or the like as a whole. If any of the second to seventh cover members 51b to 51g moves excessively for any reason while the telescopic cover 50 is extending, the stoppers at the distal ends of the opposite side walls of the cover members abut against the rear walls of their corresponding first to sixth cover members, thereby ensuring the engagement between the cover members.

When the movable table 20 reciprocates on the stationary saddle 10 in the manner described above, the telescopic cover 50 extends or contracts, thereby continually covering the top surface of the saddle and the linear guide 30, drive unit 40, etc., arranged thereon. As a result, the saddle 10, linear guide 30, drive unit 40, and their sliding surfaces are protected against swarf, dust, etc.

The present invention is not limited to the embodiment described above, and various modifications may be effected therein.

In the above embodiment, for example, only one pantograph-type support mechanism is provided. If the width of the telescopic cover 50 is great, however, two or more support mechanisms may be arranged side by side so as to extend in the extending or contracting direction of the cover. Moreover, although the guide rails 31 and 31' of the linear guide 30 are used for guiding the second to sixth cover members in the above embodiment, an exclusive-use guide member may be provided instead.

We claim:

1. In a telescopic cover apparatus mounted on a machine having a stationary section and a movable section, said movable section having a bottom surface thereof, the telescopic cover apparatus comprising:

a telescopic cover having a plurality of cover members which are slidably fitted with one another, each of said plurality of cover members being similar in shape to one another, but being larger in size than an adjacent cover member located at a side away from said movable section, each of the cover members having upper, left, right and rear walls, a first of said plurality of cover members having a front wall fixed to a machine stationary section side, and a second of said plurality of cover members having the respective rear wall fixed to a machine movable section side;

a linear guide connected to the stationary section and extending in a direction along which said telescopic cover extends and contracts, and adapted to guide at least one of said plurality of cover members, wherein said at least one of said plurality of cover members is formed with an engaging portion slidably mating with said linear guide;

a pantograph drive mechanism, disposed below said telescopic cover, for extending and contracting said telescopic cover, said pantograph drive mechanism including a plurality of quadrilateral link mechanisms which are continuously arranged in a direction along which said telescopic cover extends and contracts, each of said link mechanisms being similar in shape to one another, a dimensional ratio between adjacent ones of said link mechanisms being equal to a dimensional ratio between corresponding adjacent ones of said plurality of cover members, said pantograph drive mechanism having one end portion thereof disposed below said bottom surface of said movable section, each said link mechanism including a first pair of link members on the machine stationary section side, a second pair of link members on the machine movable section side cooperating with said first pair of link members to form a parallelogram, a first pair of joints for pivotally coupling ends of said first pair of link members which are disposed on the machine stationary section side to each other and for pivotally coupling ends of said second pair of link members which are disposed on the machine movable section side to each other, and a second pair of joints for pivotally coupling other ends of said first pair of link members to corresponding other ends of said second pair of link members, respectively, at least, one of said first pair of joints of one of said link mechanisms disposed on the machine movable section side being disposed below said bottom surface of said movable section; and a plurality of coupling members, one of which is for coupling one of the joints of the first pairs of joints of the machine stationary section side link mechanism to the front wall of said first cover member, one of which is for coupling one of the first pairs of joints of the machine movable section side link mechanism to the rear wall of said second cover member and several of which are for coupling the joints of the first pairs of joints to the cover members other than said first and second cover members.

2. A telescopic cover apparatus according to claim 1, wherein the first pairs of joints are arranged in a straight line extending in a direction along which said telescopic cover extends and contracts.

3. A telescopic cover apparatus according to claim 1, wherein said linear guide is arranged to guide the movable section of said machine.

4. A telescopic cover apparatus according to claim 1, wherein each of said plurality of coupling members is formed in an L-shape in cross section.

* * * * *

UNITED STATES PATENT AND TRADEMARK OFFICE
CERTIFICATE OF CORRECTION

PATENT NO.   :  5,169,223
DATED        :  December 8, 1992
INVENTOR(S)  :  RYUJI SUZUKI et al.

It is certified that error appears in the above-identified patent and that said Letters Patent is hereby corrected as shown below:

On title page, item [56] "OTHER PUBLICATIONS"

line 1, "Sllideway" should be

--Slideway--.

Col. 3, line 44, "57f" should be --57f'--.

Col. 5,    line 25, "57f" should be --57f'--;

line 35, "the" should be --to--.

Signed and Sealed this

Eighth Day of February, 1994

Attest:

BRUCE LEHMAN

*Attesting Officer*    *Commissioner of Patents and Trademarks*